United States Patent [19]

Hastings et al.

[11] 4,301,872

[45] Nov. 24, 1981

[54] PLOW WITH CORRELATED PULL BAR ADJUSTMENT AND SUPPORT WHEEL STEERING

[75] Inventors: Dawson W. Hastings, La Porte; Robert L. Wagner, Bloomington, both of Ind.

[73] Assignee: Allis-Chalmers Corporation, Milwaukee, Wis.

[21] Appl. No.: 182,604

[22] Filed: Aug. 29, 1980

[51] Int. Cl.³ .................. A01B 69/00; A01B 63/22; A01B 63/32

[52] U.S. Cl. .................................. 172/290; 172/311; 172/314; 172/255; 172/421; 172/417; 172/418; 172/413

[58] Field of Search ............... 172/290, 311, 314, 383, 172/413, 421, 255, 395, 407, 423, 278; 280/463

[56] References Cited

U.S. PATENT DOCUMENTS

| | | | |
|---|---|---|---|
| Re. 26,129 | 12/1966 | Pursche | 172/413 X |
| 1,013,740 | 1/1912 | Chandonnet | 172/413 X |
| 2,780,158 | 2/1957 | Pursche | 172/413 X |
| 2,898,125 | 8/1959 | Burch | 172/255 X |
| 2,959,234 | 11/1960 | Mason | 172/413 X |
| 4,036,306 | 7/1977 | Kinzenbaw | 172/569 X |
| 4,044,906 | 8/1977 | Schrag et al. | 280/463 X |
| 4,135,582 | 1/1979 | Farrant | 172/311 X |

Primary Examiner—George J. Marlo
Attorney, Agent, or Firm—Charles L. Schwab

[57] ABSTRACT

An articulated plow is provided with a laterally swingable pull bar (31) and steerable intermediate support wheels (46, 47) which are controlled by a hydraulic system providing correlated movement through parallel connected hydraulic jacks (37, 66). A latch mechanism (86) for releasably securing the pull bar (31) in its plowing position of adjustment is operated by the pull bar control jack (37) through an operating lever (41) having a lost motion connection with a spring loaded latch pin (87). A locking plate (131) is provided to automatically lock the latch pin (87) in its retracted position when the pull bar (31) is moved to its transport position.

7 Claims, 8 Drawing Figures

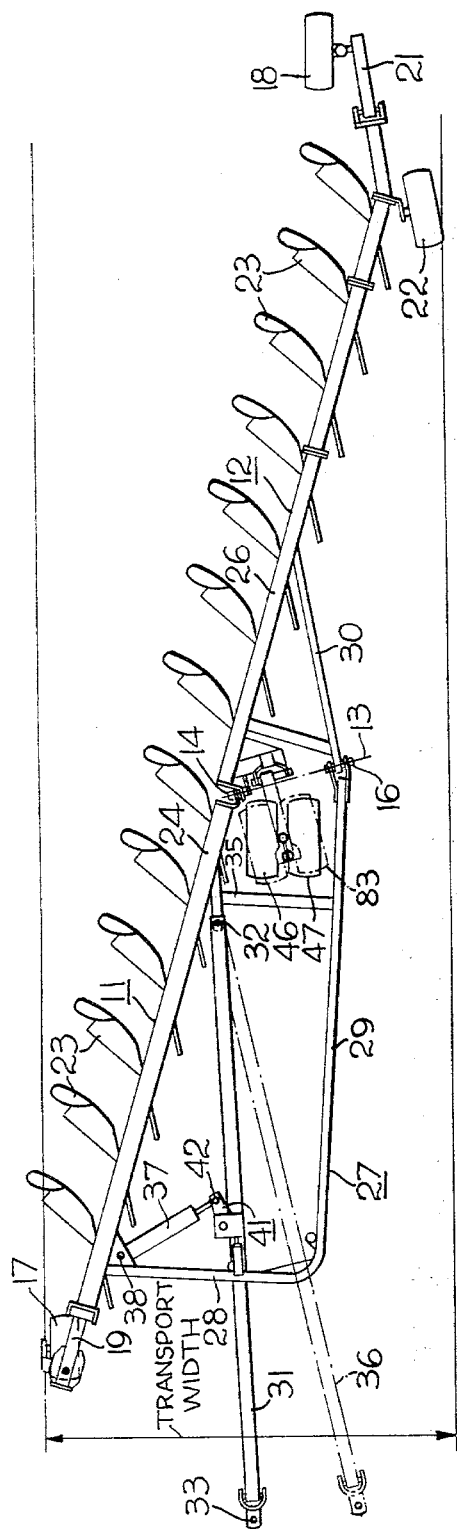
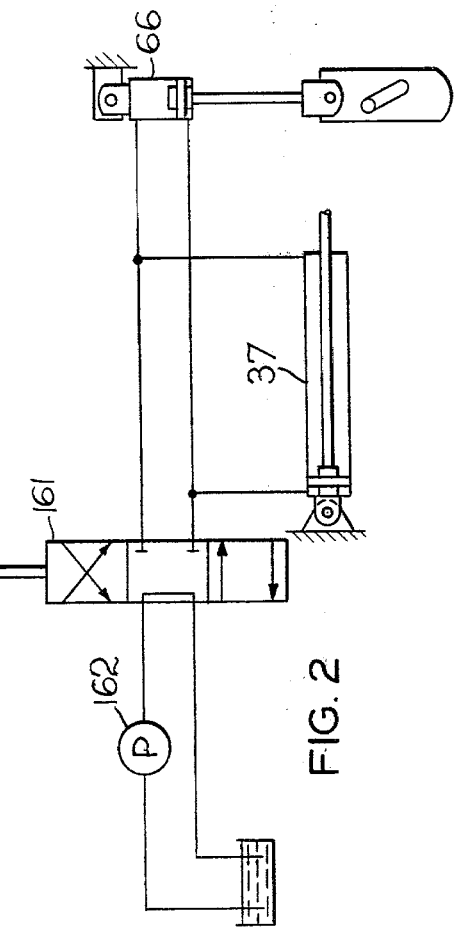
FIG. 1
FIG. 2

PLOW WITH CORRELATED PULL BAR ADJUSTMENT AND SUPPORT WHEEL STEERING

BACKGROUND OF THE INVENTION

1. Field of the Invention

This invention relates to an agricultural ground working implement, such as a plow, which has a laterally adjustable pull bar and a steerable, ground engaging support wheel.

2. Description of the Prior Art

U.S. Pat. No. 4,036,306 illustrates and describes an articulated plow with a steerable intermediate support wheel which is mechanically steered in response to simultaneous adjustment of pivoted plow bottoms and a pull bar by a double acting hydraulic jack.

The use of a double acting hydraulic jack to angle a pull bar in relation to a wheeled bale mover is shown in U.S. Pat. No. 4,044,906. In this last mentioned patent, the rod end of the hydraulic jack is connected to a pivot member having a latch projection which cooperates with a notch on the pull bar to lock the pull bar relative to the bale mover in its transport position.

SUMMARY OF THE INVENTION

The invention has particular utilization in an articulated agricultural implement such as a plow having front and rear sections pivotally interconnected on a transverse horizontal axis and supported at their remote ends by ground engaging wheels. A longitudinally extending pull bar has a front end adapted for connection to a tractor and a rear end pivotally connected to the front section for laterally swinging movement about an upright axis between working and transport positions. The articulated implement or plow is supported in part by a centrally located support wheel (or wheels) mounted on one of the front and rear sections for steering movement about a vertical axis between working and transport positions by steering means including an expansible and contractible hydraulic jack. Means are also provided to move the pull bar between its working and transport positions including an expansible and contractible hydraulic jack connected in parallel with the steering means hydraulic jack. The jacks are operated by a hydraulic control system which includes a source of pressure fluid and a control valve connected in controlling relation to the jacks and having plowing and transport positions of adjustment. The pull bar and the centrally located support wheel are simultaneously moved to their working and transport positions when the control valve is adjusted to its working and transport positions, respectively.

A latch mechanism may be provided to releasably secure the pull bar in its working position. The latch may include a movable latch part shiftably mounted on the pull bar for movement between latched and unlatched positions and a complementary latch part on the front section of the implement. A motion transmitting means interconnects the movable latch part and the hydraulic jack so as to unlatch the movable latch part when the jack connected to the pull bar is operated to swing the latter to its transport position. A shiftable locking plate may be provided which automatically locks the movable latch part in its unlatched position when the pull bar is moved to its transport position and automatically moves to an unlocked position when the pull bar is moved to its working position thereby freeing the movable latch part for movement to its latched position.

The steering means may include a vertically disposed cam plate slidably mounted on a king pin housing of a suspension structure for the centrally located support wheel which, when shifted by the steering jack, coacts with a cam follower on a steering arm on the support wheel axle to cause steering movement of the centrally located support wheel.

BRIEF DESCRIPTION OF THE DRAWINGS

One embodiment of the invention is illustrated in the drawings in which:

FIG. 1 is a top view of an articulated plow;

FIG. 2 is a schematic illustration of a hydraulic control system for the steering and pull bar positioning jacks;

DETAILED DESCRIPTION OF THE DRAWINGS

Figure 3:
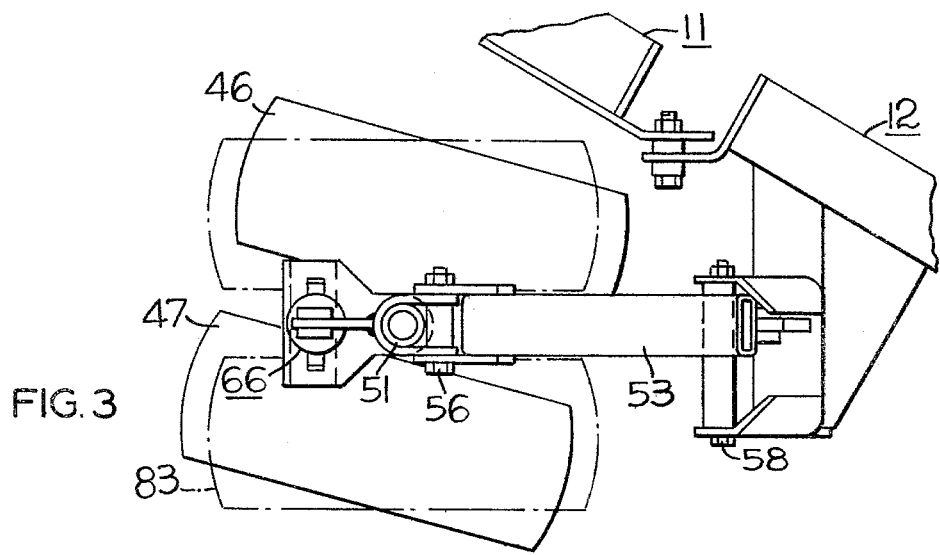
FIG. 3 is an enlarged top view of the central portion of the plow shown in FIG. 1.

Referring to FIG. 1, an earthworking implement in the form of an articulated plow is illustrated which has front and rear main frame sections 11, 12 which are pivotally interconnected on a transverse horizontal axis 13 at a pair of aligned pivot joints 14, 16. The front end of the front plow frame section 11 is supported by a ground engaging wheel 17 which may be raised and lowered relative to the front frame section 11 by conventional means, not shown. The rear end of the rear plow frame section 12 is supported by a rear ground engaging wheel 18 and it may be raised and lowered relative to the rear frame section 12 by means, not shown. Both support wheels 17, 18 are castered relative to their support linkages 19, 21. The castered support wheels 17 and 18 run in furrows during a plowing operation and a ground engaging land wheel 22, at the rear of the rear section 12, runs on unplowed ground. A plurality of plow bottoms 23 are secured to the diagonal main frames 24, 26 of the front and rear sections 11, 12 in a conventional manner. The front longitudinally extending plow section 11 includes a laterally extending bracket 27 which has a transversely extending part 28 secured as by welding to the front portion of the front section frame 24 and a longitudinally extending part 29, the rear end of which is joined by the pivot joint 16 to a front end of a lateral bracket 30 on the rear plow frame section 12. The bracket 27 includes a transverse brace 35 welded to the front section frame 24.

A pull bar 31 is pivotally connected at its rear end to the rear portion of the front plow frame section 11 by a vertical pivot pin 32. The front end of the pull bar is provided with a vertical opening 33 adapted to receive a connecting pin whereby the pull bar is connected in draft relation to a farm tractor. The pull bar 31 may be shifted from its transport position, in which is illustrated in solid lines in FIG. 1, to its working position, illustrated in broken lines 36, by a double acting hydraulic jack 37. The extensible and contractible jack 37 has its cylinder end pivotally connected by a vertical pivot pin 38 to a bracket on the front plow section 11 and has its rod pivotally connected to a latch operating lever 41 by a vertical pivot pin 42. The operation of a latching mechanism and the pull bar 31 by its operating jack 37 will be discussed in further detail in relation to FIGS. 6, 7 and 8.

Figures 4, 5:
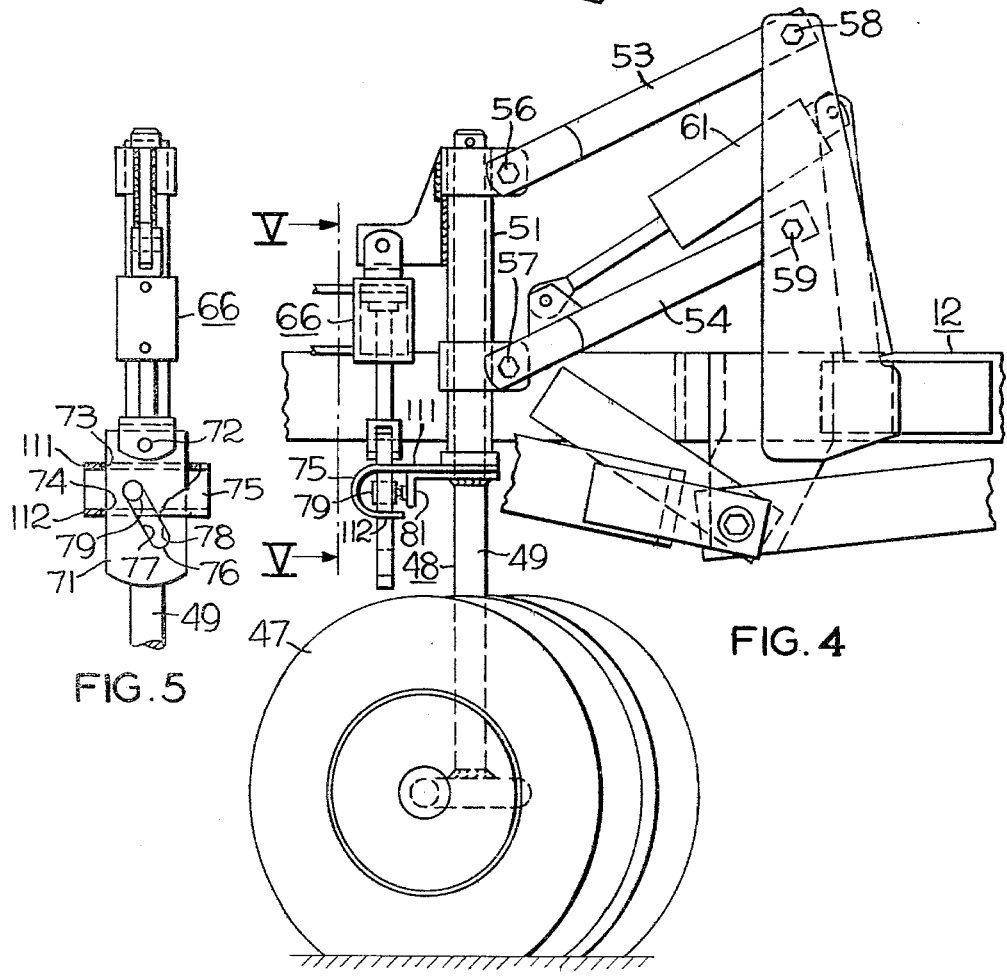
FIG. 4 is a side view of the structure shown in FIG. 3.
FIG. 5 is a view taken on the line V—V in FIG. 4.

Referring also to FIGS. 3, 4 and 5, the central portion of the articulated plow is supported by a pair of centrally located support wheels 46, 47 which are connected to the rear section by a suspension structure which will hereinafter be described. The support wheels 46, 47 are rotatably mounted on an axle structure 48 having a vertical king pin portion 49. The vertical king pin portion 49 is journaled in a king pin housing 51 which in turn is pivotally connected to upper and lower parallel links 53, 54 by transverse pivot pins 56, 57. The rear ends of the parallel links 53, 54 are pivotally connected to the front portion of the rear plow frame section 12 by a pair of vertically spaced transverse pivot pins 58, 59. The centrally located support wheels are raised and lowered relative to the central portion of the articulated plow by a double acting hydraulic jack 61 which has its cylinder end pivotally connected to the rear plow frame section 12 and its rod pivotally connected to the lower link 54. A hydraulically operated means is provided to steer the centrally located support wheels 46, 47, such means including a double acting extensible and contractible hydraulic jack 66 having its upper (cylinder) end connected to the king pin housing 51 by horizontal pin 67. The jack 66 imparts steering motion to the wheels 46, 47 through a motion transmitting means which includes a cam plate 71 connected to the rod end of the jack 66 by a horizontal pivot pin 72. The cam plate 71 is guided in upper and lower aligned slots 73, 74 in the upper and lower legs 111, 112 of a U-shaped bracket 75, the upper leg 111 of which is rigidly secured to the king pin housing 51. The cam plate 71 has an angularly disposed slot 76 defined by a pair of parallel camming surfaces 77, 78 which are in cooperative engagement with a cylindrical cam follower 79. The cam follower 79 is secured to an arm 81 which in turn is rigidly secured by welding to the king pin portion 49 of the axle 48. As illustrated in FIGS. 3, 4 and 5, the vertically disposed steering jack 66 is in its extended condition with the wheels being pivoted to their transport position. When the hydraulic jack 66 is contracted, the wheels will be turned counterclockwise, as viewed in FIG. 3, to a working position shown in broken lines 83 in FIGS. 1 and 3.

Figure 6:
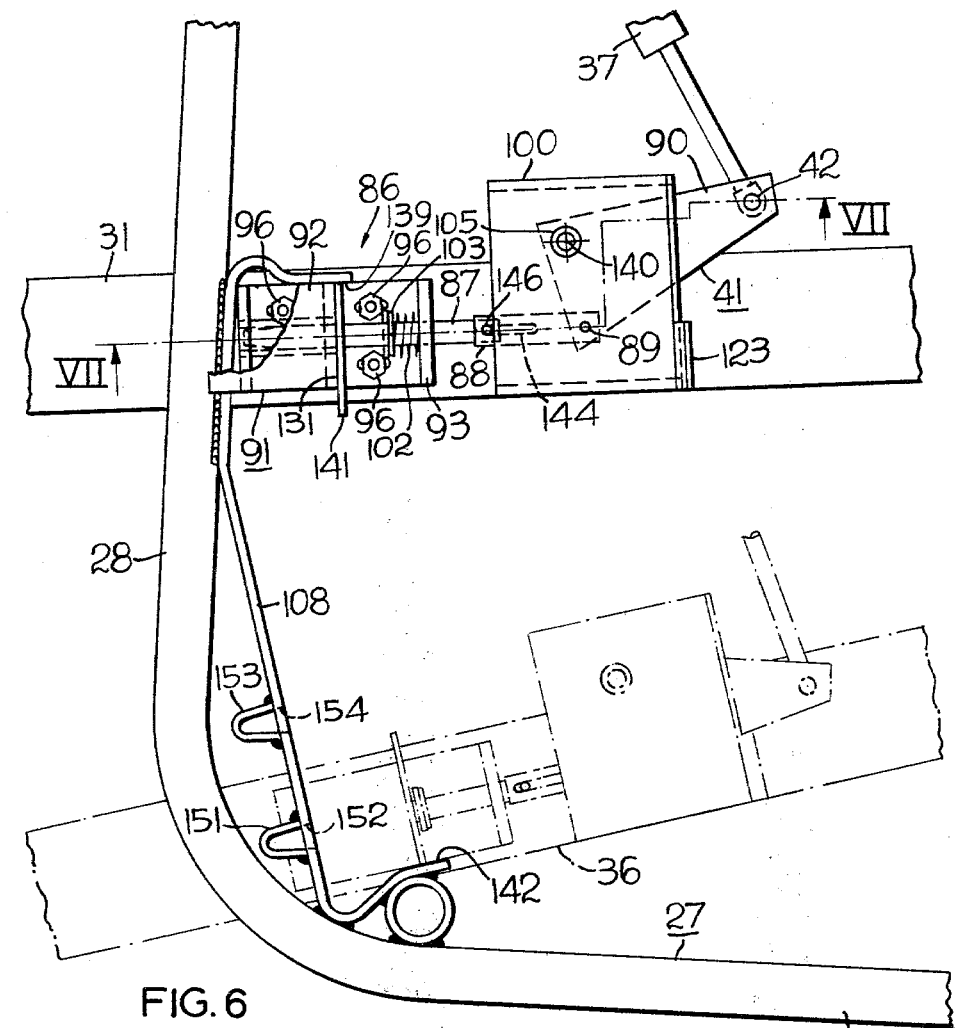
FIG. 6 is a top view of the latching mechanism for the pull bar.
Figures 7, 8:
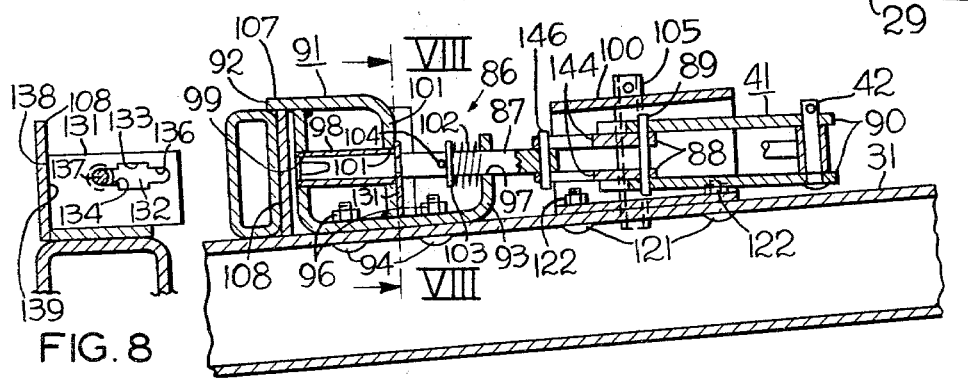
FIG. 7 is a view taken along the line VII—VII in FIG. 6.
FIG. 8 is a view taken along the line VIII—VIII in FIG. 7.

Referring to FIGS. 6, 7 and 8, the pull bar 31 is shown in its transport position and the double acting hydraulic jack 37, for controlling the position of the pull bar 31, is shown in its contracted position. A latching mechanism 86, operated by the jack 37, includes a first reciprocable latching part in the form of a pin 87 which has a pin 146 in its rear end connected to a pair of lost motion links 88 by slots 144 therein. The rear ends of the lost motion links 88 are pivotally connected to the lever 41 by a vertical pivot pin 89. The lever 41 is formed by a pair of identical upper and lower plates 90 which are pivotally connected to and within a box-like mounting structure 100 by a pivot pin 105. The mounting structure 100 is bolted to the pull bar 31 by cap screws 121 and nuts 122 and carries an abutment block 123 which limits expansion of jack 37.

The reciprocable latch pin 87 is guided by a combined guide and pull bar support structure 91 comprising an L-shaped part 92 welded to a U-shaped part 93 which in turn is bolted to the pull bar 31 by cap screws 94 and nuts 96. The cylindrical pin 87 is slidably disposed in an opening 97 in the rear upright leg of part 93 and in a bushing 98 press fitted in horizontally aligned bores 99, 101 in the front vertical wall of part 93 and a vertical wall of part 92 disposed intermediate the opposite front and rear ends of the structure 91. A coil spring 102 compressed between a washer 103, which is held against forward movement by pin 104, and the rear vertical wall of part 93, resiliently urges the pin forwardly toward its latched position, shown in broken lines 36 in FIG. 6. The forwardly extending leg 107 of the L-shaped part 92 of the guide structure 91 extends forwardly above a bent plate bracket 108 welded to the lateral bracket 27, thus serving to support the pull bar 31 as it swings laterally between its transport and working positions.

A shiftable locking plate 131 coacts with the latch pin 87 to lock the latter in its unlatched condition, as shown in solid lines in FIG. 6, when the pull bar is in its transport position. The locking plate includes a slot 132 which has an enlarged central portion 133 through which the pin 87 freely moves and narrow end portions 134, 136 which are engageable by a reduced diameter portion or recess 137, but not the full diameter portion of the latch pin 87. As shown in FIG. 8, the narrow portion 134 has registered with the recess 137 in the latch pin 87 to thereby lock the latter in its unlatched position. The locking plate 131 was moved into its locking position illustrated in FIGS. 6, 7 and 8 by engagement of its lateral end abutment surface 138 with an abutment surface 139 on the bracket 108. When the jack 37 is expanded to move the pull bar 31 from its transport to its working position, the locking plate 131 will keep the latch pin 87 locked in its retracted, unlatched position until an abutment surface 141 on the opposite lateral end of the locking plate engages an abutment surface 142 on the bracket 108. During initial expansion of the jack 37, the lever 41 moves clockwise as viewed in FIG. 6 about the rocking axis 140 of pin 105 until it abuts against abutment part 123 during which the slots 144 in lost motion links 88 allow the latter to move forward relative to the connecting pin 146 in the rear of the latch pin 87. When the locking plate is shifted to its unlocked position, as shown in broken lines 36 in FIG. 6, the latch pin 87 registers with the enlarged portion 133 of the locking plate 131 and the biasing means in the form of coil spring 102 shifts the latch pin 87 forwardly to its latching position in which its forward tapered end engages a latching part 151 formed by a U-shaped piece welded to the bracket 108 to register with an opening 152 therein. An alternate latching part 153, and opening 154, is provided on the bracket 108 in order to provide an alternate working position for the pull bar 31.

OPERATION

As shown in the drawings, the pull bar 31 and the intermediate support wheels 46, 47 are in their transport position in which condition the transport width of the plow is reduced sufficiently to permit it to be moved through gates and towed to and from the field. In preparation for plowing, the operator will shift manually operated control valve 161 downwardly as viewed in FIG. 2 to its working (plowing) position to connect the source of pressure fluid, pump 162, with the closed end of jack 37 and the rod end of jack 66. Since the jacks 37, 66 are connected in parallel, they are actuated simultaneously to move the pull bar to its working position and to steer the intermediate support wheels 46, 47 to their working position, such positions being shown in broken lines 36, 83 in FIG. 1. The locking plate 131, which is shifted to its locking position upon abutment with abutment surface 139 as the pull bar 31 is moved to its transport position, keeps the latch pin 87 retracted during movement of the pull bar 31 from its transport position to its working (plowing) position. Upon abutment with abutment surface 142, the locking plate is shifted to its unlocked position and the latch pin 87 is permitted to shift to its latching position in which it cooperatively engages the complementary latch part 151. When it is desired to again adjust the plow to a transport condition, the operator moves the control valve 161 from its illustrated hold position upwardly to its transport position in which pressure fluid is delivered to the rod end of the jack 37 and the closed end of the jack 66, thus causing the pull bar 31 and the intermediate support wheels 46, 47 to be adjusted to their transport positions. It will be noted that the latch pin is in its unlatched position when the pull bar 31 is in its transport position. The pull bar is held in such position by the contracted pull bar control jack 37.

The embodiments of the invention in which an exclusive property or privilege is claimed are defined as follows:

1. An articulated plow having front and rear sections whose adjacent ends are pivotally interconnected on a transverse horizontal axis and whose remote ends are supported by ground engaging wheels characterized by
   a longitudinally extending pull bar having
   a front end adapted for connection to a tractor and
   a rear end pivotally connected to said front section for laterally swinging movement about an upright axis between plowing and transport positions,
   a centrally located support wheel mounted on one of said sections for steering movement about a vertical axis between plowing and transport positions,
   means operable to steer said centrally located support wheel including a first expansible and contractible hydraulic jack,
   means operable to move said pull bar between its plowing and transport positions including a second expansible and contractible hydraulic jack connected in parallel to said first hydraulic jack, and
   a hydraulic control system for said jacks including a source of pressure fluid, a control valve connected in controlling relation to said jacks and shiftable between plowing and transport positions, said pull bar and centrally located support wheel being simultaneously moved to their plowing and transport positions when said control valve is placed in its plowing and transport positions, respectively.

2. The plow of claim 1 wherein said jacks are double acting and said control valve has a hold position.

3. The plow of claim 2 and further comprising a latch mechanism including a first latch part fixedly secured to said front section, a second latch part shiftably mounted on said pull bar for movement between latched and unlatched positions and motion transmitting means connecting said second latch part and said second hydraulic jack, said second latch part being in its latched position in engagement with said first latch part when said pull bar is in its plowing position and said motion transmitting means moving said second latch part to its unlatched position when said second hydraulic jack is operated to move said pull bar to its transport position.

4. The plow of claim 3 wherein said motion transmitting means includes a lever pivotally mounted on said pull bar on a rocking axis transverse to the direction of expansion and contraction movement of said second hydraulic jack and means connecting said second latch part and said second hydraulic jack to said lever at points spaced from one another and from said rocking axis.

5. The plow of claim 3 wherein said latch mechanism includes a locking plate shiftably mounted on said pull bar for shifting movement transverse to said second latch part between locked and unlocked positions cooperable locking portions on said second latch part and said locking plate engageable to prevent movement of said second latch part from its unlatched position to its latched position and a first pair of cooperable abutment surfaces on said locking plate and said front section, said abutment surfaces engaging said locking plate shifting the latter from its unlocked position to its locked position when said pull bar is moved to its transport position and a second pair of cooperable abutment surfaces on said locking plate and said front section engageable to shift said locking plate from its locked position to its unlocked position when said pull bar is moved to its plowing position.

6. The plow of claim 1 and further comprising a suspension structure interconnecting said centrally located support wheel and said one section including a king pin housing, an axle including a king pin portion journaled in said housing for pivotal steering movement about said upright axis, a steering arm rigidly secured to said king pin portion, means connecting one end of said first jack to said king pin housing and motion transmitting means connecting the other end of said first jack to said steering arm.

7. The plow of claim 6 wherein said motion transmitting means includes a vertically disposed cam plate, slidably mounted on said king pin housing for vertical reciprocating movement and having an angularly disposed slot defined by a pair of parallel camming surfaces and a cam follower on said steering arm in cooperative engagement with said camming surfaces.

* * * * *